United States Patent
Golden

(10) Patent No.: US 6,918,737 B2
(45) Date of Patent: Jul. 19, 2005

(54) SYSTEM AND METHOD FOR STACKING A PREDETERMINED NUMBER OF NESTABLE OBJECTS

(75) Inventor: Randy Golden, Ada, OK (US)

(73) Assignee: Solo Cup Company, Highland Park, IL (US)

( * ) Notice: Subject to any disclaimer, the term of this patent is extended or adjusted under 35 U.S.C. 154(b) by 174 days.

(21) Appl. No.: 10/292,751

(22) Filed: Nov. 12, 2002

(65) Prior Publication Data

US 2004/0086371 A1 May 6, 2004

Related U.S. Application Data

(63) Continuation-in-part of application No. 10/285,382, filed on Oct. 31, 2002.

(51) Int. Cl.$^7$ ................................................ B65G 57/00
(52) U.S. Cl. .................. 414/790.3; 414/802; 414/788.2
(58) Field of Search ................................ 414/800, 802, 414/788.2, 789.9, 790.3, 798.4

(56) References Cited

U.S. PATENT DOCUMENTS

| | | | |
|---|---|---|---|
| 3,499,063 A | | 3/1970 | Ninneman et al. |
| 4,006,831 A | | 2/1977 | Jimenez |
| 4,526,074 A | * | 7/1985 | Johnson ........................ 83/97 |
| 4,545,714 A | | 10/1985 | Johnson et al. |
| 4,597,705 A | | 7/1986 | Scheeler et al. |
| 4,743,153 A | | 5/1988 | Kontz |
| 4,802,808 A | | 2/1989 | Wölk et al. |
| 4,834,606 A | | 5/1989 | Burns et al. |
| 4,869,359 A | | 9/1989 | Muller et al. |
| 4,890,524 A | * | 1/1990 | Brown et al. ................. 83/615 |
| 5,122,029 A | * | 6/1992 | DelDuca .................. 414/789.2 |
| 5,222,858 A | | 6/1993 | Fazion |
| 5,234,313 A | | 8/1993 | DelDuca |
| 5,249,492 A | | 10/1993 | Brown et al. |
| 5,267,827 A | | 12/1993 | Provan et al. |
| 5,763,861 A | | 6/1998 | Herrera et al. |
| 5,779,432 A | | 7/1998 | Pena |
| 6,241,457 B1 | | 6/2001 | Hüttig et al. |
| 6,302,638 B1 | | 10/2001 | Eggebrecht et al. |
| 6,435,067 B1 | * | 8/2002 | Irwin .......................... 43/228 |
| 6,722,237 B2 | * | 4/2004 | Irwin ............................ 83/13 |

* cited by examiner

*Primary Examiner*—Richard Ridley
(74) *Attorney, Agent, or Firm*—Wallenstein Wagner & Rockey, Ltd.

(57) ABSTRACT

A system and method for stacking a predetermined number of nestable objects is disclosed, including several alternative embodiments. The system is preferably designed for use with a plurality of nestable objects each having a measurable thickness. A cavity is configured for containing the nestable objects in an orientated position. The objects may be taken directly from a manufacturing process or otherwise loaded to the system at a receiving end. An ejector mechanism operates at the receiving end of the cavity to tamp, by relatively short strokes, successive objects into the cavity until a predetermined number of objects is achieved. At the point of tamping the last object into the cavity, the ejector executes a longer stroke to advance the now vertically oriented and stacked objects toward a discharge end of the cavity. A flange is functionally positioned proximate the discharge end of the cavity to create a span within the cavity having a length. In use the flange halts the advancement of an edge of the stacked arrangement of objects while the remaining edges continue forward. The result is a change in the orientation of the stacked arrangement of nestable objects upon reaching the predetermined number of objects within the cavity. The reorienting objects are simultaneously discharged from the cavity. The length of the span created by the flange and the cycled ejector strokes cooperate within the cavity to allow for the reorientation of the same number of stacked objects each cycle.

9 Claims, 4 Drawing Sheets

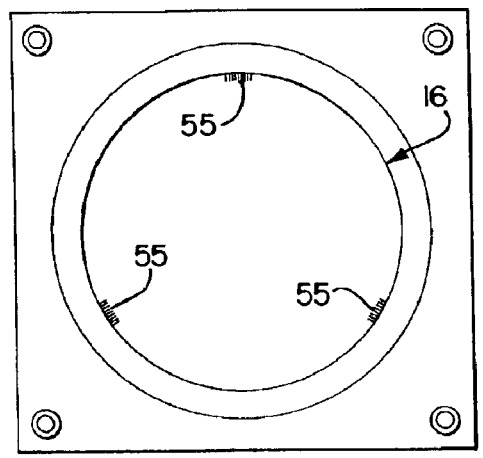
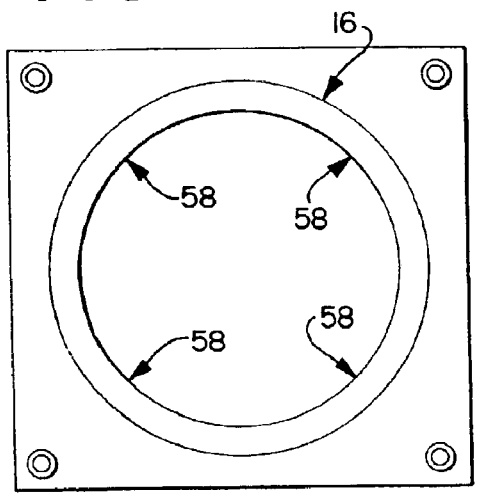
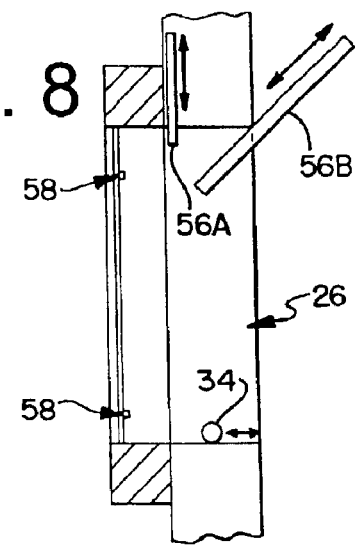
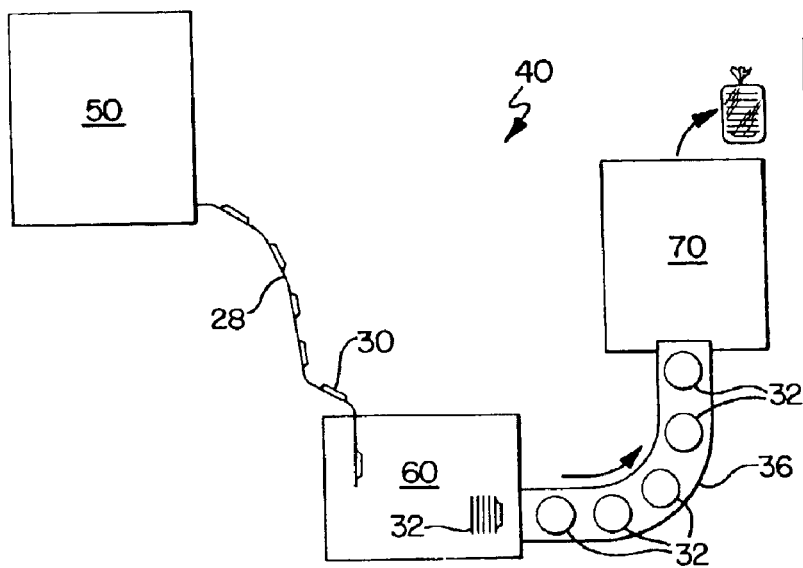

SYSTEM AND METHOD FOR STACKING A PREDETERMINED NUMBER OF NESTABLE OBJECTS

RELATED APPLICATION

The present application is a continuation-in-part of U.S. patent application Ser. No. 10/285,382, filed on Oct. 31, 2002, which is expressly incorporated herein by reference.

TECHNICAL FIELD

This invention relates generally to systems and methods for stacking a predetermined number of nestable objects, such as plates, bowls, trays, cups, lids, covers, and the like. More particularly, the present invention relates to the use of a stationary component to indicate achievement of a predetermined number of stacked objects, and further, the use of gravity to change the orientation of the predetermined number of stacked objects for simplifying packaging of the same.

BACKGROUND ART

The manufacture of objects which are best suited for packaging in a stacked arrangement is commonplace in the United States, as well as other countries throughout the world. Machines have been created that can manufacture such objects at great cycle rates. Often it is desirable to stack these objects in identical, predetermined count-size stacks—for example, stacks of 25 plates or 30 cups or 20 lids, etc. This is particularly useful when the objects are to packaged for direct wholesale or retail sale.

However, there have been significant restraints on the ability to accurately and quickly count stacked objects. This may stem, in part, from the apparent lag of the technology employed to accurately count stacked objects behind the machines used to manufacture and stack the objects. Often, as a default, the stacked objects are counted manually. Obviously, this has a number of drawbacks including labor and speed.

There have been some forays into the development of apparatus that would automatically count and stack objects. However, these prior art devices are either non-optimal—by creating numerous restraints on the process of forming, counting, stacking, and packaging of nestable objects—or are overly complex—requiring additional moving parts, space, or both.

One non-optimized restraint of the prior art has been the speed at which stacking systems operate. Often, they are required to operate at a slower rate than the potential for the manufacturing machines, necessitating the slow down of the entire process. Slowed production rates can have a significant negative impact on a company's profitability.

Another restraint concerns the accuracy of the object count in stacks. Prior art stackers have been unable to consistently and readily stack a predetermined number of objects. As a result, either a double check is required, costing more time and energy, or the products are shipped off with an incorrect number of objects in any particular stack, to the possible detriment of a company's reputation.

Still another restraint of concern is reliability. Ideally, the stacker should work every time to create a stack with the correct number of objects. However, complexity of mechanics may result in frequent down-time and increased maintenance costs. Further, the complex machines require human labor to either supervise the machine's operation or participate in the stacking process. This may create difficulties including increased labor costs, slower operation, and the possibility of injury.

The prior art has failed to provide adequate solutions to alleviate all of these restraints. One attempt at forming stacks with a predetermined count is disclosed in U.S. Pat. No. 4,545,714, issued to Johnson et al. This patent describes a pneumatically-operated feed conduit which has containers blown therethrough by using a pneumatic blowing device, and propelled to a first location to form a nested stack of containers. While at a first location, the containers are sensed by a photoelectric device. The nested containers are then conveyed to a second station located vertically below the first wherein a plurality of rotating resilient elements contact the edge of each of the containers to advance them downward. A conveyor drive, adapted to coact with the resilient elements at a higher linear speed, engages an end of one of the containers with a projecting member to separate the stack. A predetermined count is achieved by having the projecting member interact at a specific time interval with the rotating resilient elements.

U.S. Pat. No. 4,802,808, issued to Wolk et al., describes a stacking apparatus for deep-drawn articles of plastics. The '808 patent discloses a lower stacking plate and an upper stacking plate which are adapted to receive formed articles from a forming die. The lower and upper stacking plates are used to form a vertical stack of formed articles. The upper stacking plate, including a stack of formed articles, can be raised to a position on the working level of a removal station. The removal station has a support plate that moves forward underneath the raised stack, a pushing device that is above the support plate that moves parallel relative to the support plate, and a tilting frame located adjacent the support plate when the support plate is in the forwardly moved position. The tilting frame tilts about a horizontal axis from an upright receiving position to a laterally directed discharge position.

U.S. Pat. No. 5,234,313, issued to DelDuca, discloses a method for automatically counting and stacking trimmed molded articles. The '313 patent describes a trim press and an apparatus for stacking articles trimmed by the trim press. The apparatus for stacking includes a frame, a carriage mounted to the frame, at least one stacking mechanism, and a moving mechanism for transporting the completed stack of articles from within the die shoe of the stationary die member to a position for removal from the apparatus.

U.S. Pat. No. 6,241,457, issued to Huttig et al., discloses a stacking apparatus for a thermoforming machine. The '457 patent describes a lower stacking plate that picks up articles ejected from a thermoforming machine. The Huttig device has an upper stacking plate juxtaposed with the lower stacking plate, and complementary thereto, for receiving deep-drawn articles from the lower stacking plate and for retaining a column of the articles. A pivot arm carries the upper stacking plate; the upper stacking plate is raisable and lowerable on the pivot arm. A carriage having guide rollers has the pivot arm articulated to it for swingable movement about an arm pivot. A support has a guide bar swingably mounted at a horizontal pivot axis. The guide bar is engaged by the rollers for guiding the carriage therealong, whereby a column of the articles on the upper stacking plate is swingable from a receiving position to a deposition position. The patent also discloses means for securing the guide bar selectively in a first angular position about the horizontal pivot axis in which the upper stacking plate is constrained to deposit columns of the covers forming the articles in a vertical orientation on the surface and columns of the cups forming the articles in a horizontal orientation on the surface.

Each of the above-cited references has failed to provide a simplistic answer to the problem of reliably, accurately and efficiently counting stacked objects. The apparatus and methods of the present invention overcome the disadvantages of these and other prior art devices and techniques. The present invention is focused on performing at a speed substantially equal to modern thermoforming machines. It is fully automated, accurate and precise in its formation of stacked objects of a predetermined number. It is also reliable and easily maintained and adjustable. Furthermore, it requires a relatively small amount of physical space, opening up that space for other uses.

SUMMARY OF THE INVENTION

In accordance with this invention, a new apparatus and method for automatically stacking a predetermined number of objects is disclosed. Preferably, the objects are formed from a web of thermoplastic sheet material, which sheet is initially formed utilizing well-known thermoplastic forming techniques. Generally, it is well known in the art to have a manufacturing source take a preheated thermoplastic sheet and place it between male and female mold halves which, as they close, press and form the sheet into the desired product shape. Once formed, the nestable objects are discharged from the manufacturing source to a trimming device. Of course, the current invention can be achieved using any of a wide range of manufacturing devices that are able to form and trim nestable objects in any of a wide range of methods.

The invention employs a stacking device that is adapted to receive nestable objects from the manufacturing source. The stacking device comprises a cavity. The cavity receives the nestable objects one at a time in a receiving end of the cavity by actuation of an ejector. The ejector moves axially to the cavity, in a short stroke, to displace a formed nestable object previously trimmed from the web material by, for example, a punch and die, and move the object into the cavity. The cavity retains the desired number of object in an orientated and stacked arrangement. Several mechanisms are possible to assist the retention of the stacked arrangement within the cavity. Most importantly, the cavity comprises a flange functionally positioned proximate the discharge end. To complete the cycle, a final actuation of the ejector, a longer stroke than previous strokes, forces a final nestable object from the web to the retained oriented and stacked arrangement, and then out a discharge end of the cavity.

In one embodiment of the current invention, the width of each of the nestable objects is determined. Also, determined is the approximate total width of a stack of a predetermined number of the nestable objects. The flange may be set at approximately the determined total width of the stack—including some additional length for the extended discharge stroke of the ejector. For example, it may be determined that a stack of ten to fifteen nestable objects has a width of about six inches. If one wanted to have the stacking apparatus stack, for example, ten to fifteen objects, then the flange would be functionally positioned to create a span that is substantially equal to six inches plus the additional ejector stroke length. Once such a span is created, the stacking apparatus will automatically form stacks of ten nestable objects. The stack is held within the span in one orientation until it is subsequently changed upon contact with the flange on the final ejector stroke.

In a preferred embodiment, the orientation change is from a substantially horizontal position to a substantially vertical position. Each stack of objects would be simultaneously discharged from the stacking apparatus to achieve the orientation change.

In one embodiment of this invention, a surface for receiving the stack of nestable objects is provided. This surface can be, for example, a conveyor or indexing table. In one embodiment, the use of a conveyor would allow the transport of ejected stacks to a packaging device, which might package the stack of nestable objects for further processing or sale. In another embodiment, the stacking apparatus would discharge the stacked objects directly to the packaging device allowing for immediate packing. In another embodiment utilizing the indexing table or other suitable device, stacks of objects may be ejected in smaller quantities but held in place until a predetermined larger stack size is accumulated on the table. That is, for example, five stacks of ten objects when combined would create a final stack of 50 objects. The final stack could then be transported by the indexing table for further processing.

Other advantages and aspects of the present invention will become apparent upon reading the following detailed description of the invention in conjunction with the appended drawings and claims.

DESCRIPTION OF THE DRAWINGS

For further facilitating the understanding of the present invention, three drawing figures are appended hereto, wherein:

FIG. 6 is a front view of one embodiment of the present invention utilizing bristled extensions to retain stacked objects oriented within the cavity;

FIG. 7 is a front view of another embodiment of the present invention having grooved tight spots to retain stacked objects oriented within the cavity;

FIG. 8 is a partial cross-section of the cavity of FIG. 6 taken along line 7—7 which diagrammatically illustrates two possible retractable retention mechanisms for use in the present invention; and FIG. 9 is a diagrammatic illustration of a system for manufacturing, trimming, stacking, and packaging nestable objects.

DETAILED DESCRIPTION OF PREFERRED EMBODIMENT

Figure 1:
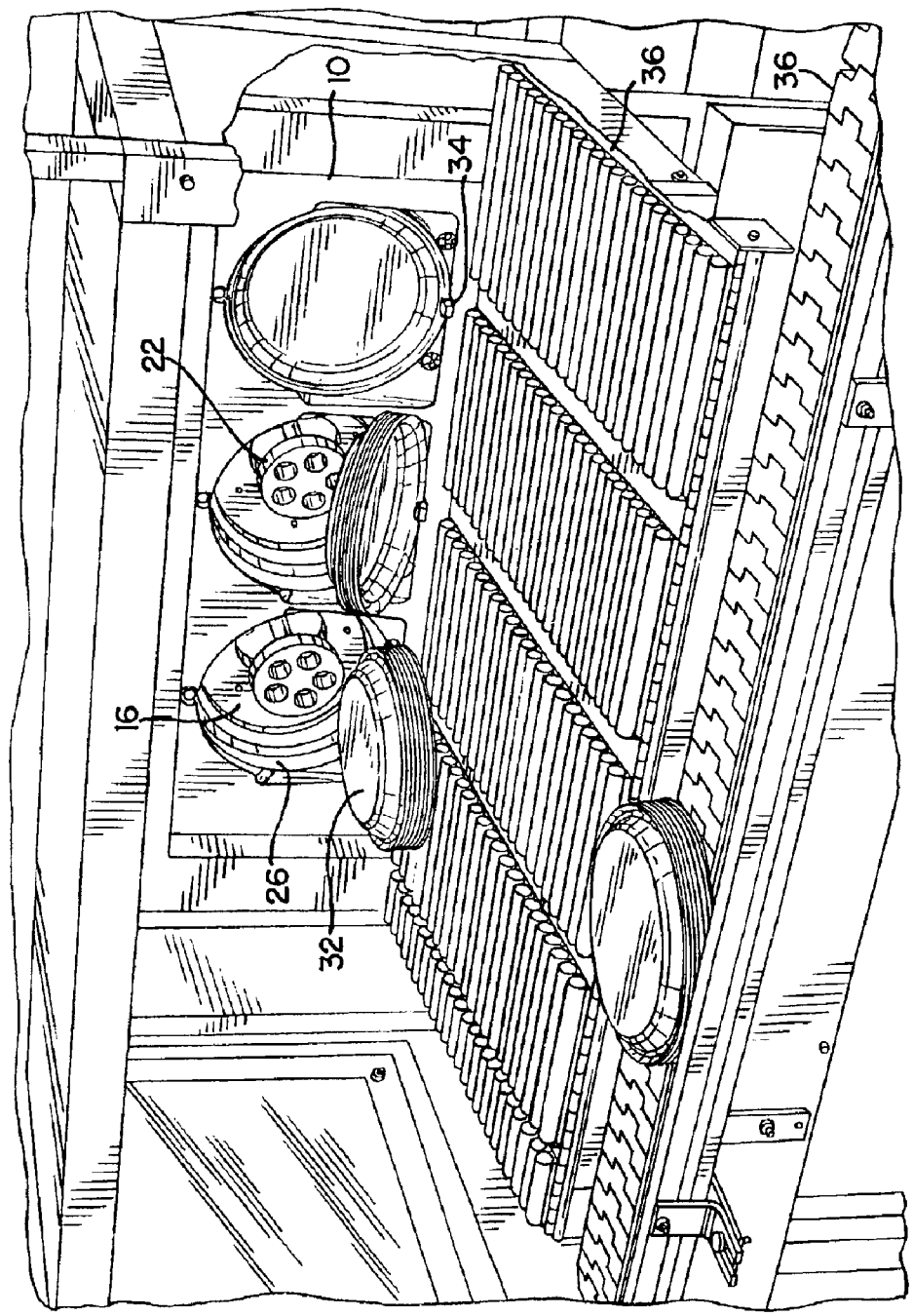
FIG. 1 is a perspective of three exit ports on a plate trim machine with an adjacent roller table illustrating the use of one embodiment of the present invention.
Figure 2:
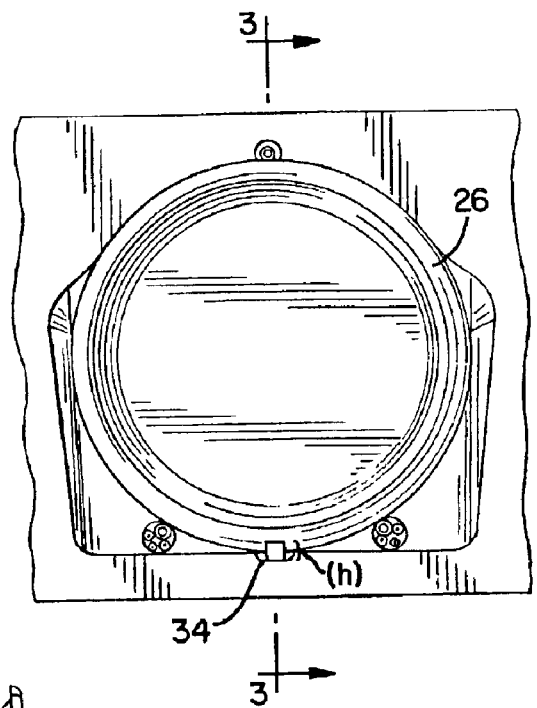
FIG. 2 is a front view of a single exit port of FIG. 1.

While the invention is susceptible of embodiment in many different forms, this disclosure will describe in detail preferred embodiments of the invention with the understanding that the present disclosure is to be considered as an exemplification of the principles of the invention and is not intended to limit the broad aspect of the invention to the embodiments illustrated.

The prior art discloses numerous methods and apparatus for the formation of nestable objects. Such a device and method are disclosed in U.S. Pat. No. 5,362,436, issued to Wagner, and assigned to the assignee of the present invention. The disclosure of the '436 patent, to the extent it supports the present application for patent, is incorporated herein by reference. While the "nestable object" is shown in the accompanying drawings and described below as a thermoformed plate, this is to be considered exemplary only. The definition of the term "nestable" includes substantially planar and non-planar objects which are capable of being seated to any degree within one another to form a stack of such objects. A stack may consist of as few as two objects. Such objects may be alternatively referred to herein as "stackable" or "stacked" objects. Several suitable examples of these nestable objects include plates, bowls, trays, covers, cups, lids, platters, food containers, disks, and the like, each of which could possibly benefit from the advantages of the present invention.

Accordingly, the present invention involves methods and apparatus for automatically stacking a predetermined number of nestable objects. While the nestable objects may be made from any known material, preferably the objects are made from a thermoplastic material. Generally speaking, the nestable objects are produced by a manufacturing device. These objects are typically produced by forming a thermoplastic sheet material utilizing well-known thermoplastic extrusion techniques. The sheet is then processed to form a number of different objects within the sheet. One method of processing involves preheating the thermoplastic sheet and placing it between male and female mold halves, which, as they close, press and form a portion of the sheet into the desired product shape.

An alternative technique is disclosed in U.S. Pat No. 3,825,166, the disclosure of which is incorporated herein by reference. This technique includes a two-stage thermoforming technique whereby, utilizing a plug member, a preheated plastic sheet is only partially preformed into a desired configuration and, after the preforming step, the thermoforming step is completed whereby the matched mold members come together to form the desired finished article. These embodiments merely serve as examples, as any manufacturing source of nestable objects will suffice. Particularly suitable thermoforming machines are manufactured by Brown Machine, Inc. of Beaverton, Mich.

After being formed, the sheet of thermoformed plates is received by the device of the present invention for trimming. Referring generally to FIGS. 1–5, such a trimming device can be seen and is generally referred to by the reference numeral "10". Particularly suitable trimming devices are also manufactured by Brown Machine Inc. of Beaverton, Mich.

Referring still to FIGS. 1–5, the trimming device 10 is comprised, generally, of a web feed channel 14, a cavity 16 defined by the first cutting edge 18 of the device 10, a second cutting edge 20 of the device 10, and an ejector 22 proximate the second cutting edge 20. The cavity 16 is configured for containing the type of nestable objects produced by the manufacturing source.

In the embodiment of FIG. 6, each cavity 16 contains three (3) equidistantly spaced bristled extensions 55 to contact the stack of plates as it is being built. As each plate is cut out it is moved forward by the ejector 22 to be captured in the bristled extensions 55. Naturally, any number of these bristled extensions 55 may be used within the cavity sidewall to achieve the retention of stacked objects. Those skilled in the art would understand the positioning requirements of the bristled extensions 55 to achieve the retention goal.

Alternatively, as illustrated in FIGS. 7 and 8, a retractable mechanism 56 may be used to retain a stack oriented by abutting a point of the stack. The retractable mechanism 56 may protrude from the top of the cavity 16 (i.e., mechanism 56A) or from the front of the cavity 16 (i.e., mechanism 56B). Additionally, the retractable mechanism 56 may be accompanied by grooved tight spots 58 within the cavity 16. Preferably, four (4) tight spots 58 are utilized to retain the orientation of a stack. The grooved tight spots 58 function in a manner very similar to the bristled extensions 55 of the alternative embodiment.

Returning to FIGS. 1–5, the cavity 16 has a receiving end 24 and a discharge end 26. Upon receipt of a plate 30, the cavity 16 contains the plate 30 in an orientated position as disclosed previously. In a preferred embodiment, that orientation is substantially vertical. As the manufacturing source continues to produce the web of plates 30, plates may be successively received by the trimming device cavity 16. The additional plates are similarly held in a vertically orientated position. When the cavity 16 receives at least two plates, a stack 32 can be formed in the cavity 16, with all of the plates 30 therein contained in an orientated position. The result is a stack 32 of plates contained in an orientated position.

One embodiment of the present invention comprises the addition of a flange 34 functionally positioned proximate the discharge end 26 of the cavity 16. As used here, "flange" means any flange, protrusion, tab, rim, edge, rib, clip, collar, projection, or the like that is able to perform the functions disclosed herein. The term also encompasses the use of a plurality of such objects. In one embodiment, the flange 34 may be held proximate to the cavity 16 by a support of some kind. In another embodiment, the flange may be functionally affixed to the discharge end 26 of the cavity 16. Preferably, the flange 34 is affixed to a bottom quarter of the discharge end 26. The flange 34 extends in a plane substantially perpendicular to the cavity 16, the extent to which the flange 34 extends being called a height (h). In one embodiment, the height (h) of the flange 34 can be adjusted to suit the particular objects being stacked and counted. The adaptation of this adjustment feature can be accomplished by means well-known in the art.

Furthermore, indexing means (not shown) may be provided to allow for accurate and precise adjustments that are easily repeatable. In practice, when stacking smaller objects, the flange 34 may be extended to have a relatively small height of, for example, a centimeter. Of course, for the stacking of larger objects the flange 34 may be extended to have a height of, for example, an inch. However, in other embodiments of the invention, and as illustrated in FIGS. 2–5, the flange height (h) is fixed. The fixed flange is suitable for many applications.

During operation of the counting and stacking apparatus, the flange 34 is preferably stationary. The longitudinal position of the flange 34 in relation to the cavity 16 creates a span (s) with a length within the cavity 16. The position selected for the flange 34, and thus the length of the span (s) selected, may depend somewhat upon the dimensions of the nestable objects and the number of nestable objects desired in one stack. That is, to determine where to position the flange 34, it is possible to determine first the thickness of a single nestable object. As an alternative, it is also possible to determine the thickness of a predetermined number of the nestable objects when they are stacked, for example, 10 to 15 objects.

Once the number of objects or desired thickness has been selected, the flange 34 may be positioned to create a suitable span (s) within the cavity 16. The span (s) should have a length at least substantially equal to the total thickness of the predetermined number of nestable objects plus a reasonable distance for the long stroke of the ejector 22. The word "substantially," as it relates to equal, means that the flange 34 is positioned at a longitudinal location, in relation to the cavity 16, where it will automatically change the orientation of the plurality of nestable objects upon being contacted by the lower edge of the ejecting stack 32. Therefore, "substantial" is a functional requirement rather than spatially defined, although it will correspond to certain spatial limits.

Further, while it is the ejector 22, and specifically the ejector stroke, which determines the stack size, the cavity span (s) is a factor to be considered. Accordingly, in one embodiment of the present invention, the flange 34 may be adjustable in a direction parallel to a longitudinal axis of the cavity 16 to change the length of the span (s). The adjustment feature can be utilized in numerous ways that would be well-understood by those skilled in the art. This adjustment feature allows for the present apparatus to be easily adapted to stacking of either a different number of nestable objects (e.g., switching from 10 objects to 50 objects), a different type or size of nestable objects—assuming a substantially different thickness of these objects, or both. For example, a stack of fifty (50) plates might necessitate positioning the flange 34 in a first longitudinal location, while a stack of ten (10) of the same plates or a stack of twenty-five (25) thinner material lids might necessitate positioning the flange 34 in a second, different longitudinal location. The embodiment discussed herein allows for the flange 34 to be adjusted in a direction parallel to a longitudinal axis of the cavity 16 to create a span (s) that would be appropriate for a plurality of different numbers of stacked objects.

In a preferred embodiment, an indexing mechanism (not shown) may be provided to determine the longitudinal adjustment to the flange 34. One method, although others would certainly fall within the scope of the claimed invention, would be to determine the thickness of commonly created stacks, for example, the thickness of ten bowls, twenty-five bowls, ten plates, twenty-five plates, etc. A form of a ruler or look-up table could be created which might have listed such measures and could be employed to adjust the position of the flange 34 when necessary. In another embodiment, the distances could be indexed on the cavity 16 itself, allowing for a worker to make an adjustment quickly without needing other resources.

In still another embodiment, the cavity 16 may be adjustable along its longitudinal axis to either increase or decrease the length of the span (s). The desired distance of increase or decrease can be determined by methods described hereinabove. The cavity 16 might be expanded to increase the length of the span (s) by a number of techniques. One example might be to provide a cavity capable of having cavity extension portions inserted therein. In one embodiment, a cavity extension portion might have the flange 34 affixed thereto, and could be attachable to the discharge end of the cavity 16. Different cavity extension portions (not shown) might be designed to have different lengths which could be easily replaced, one for another. Such a system would allow a worker to have the present invention count and stack a different number of predetermined objects by merely selecting and attaching the appropriate cavity extension portion.

Figure 3:
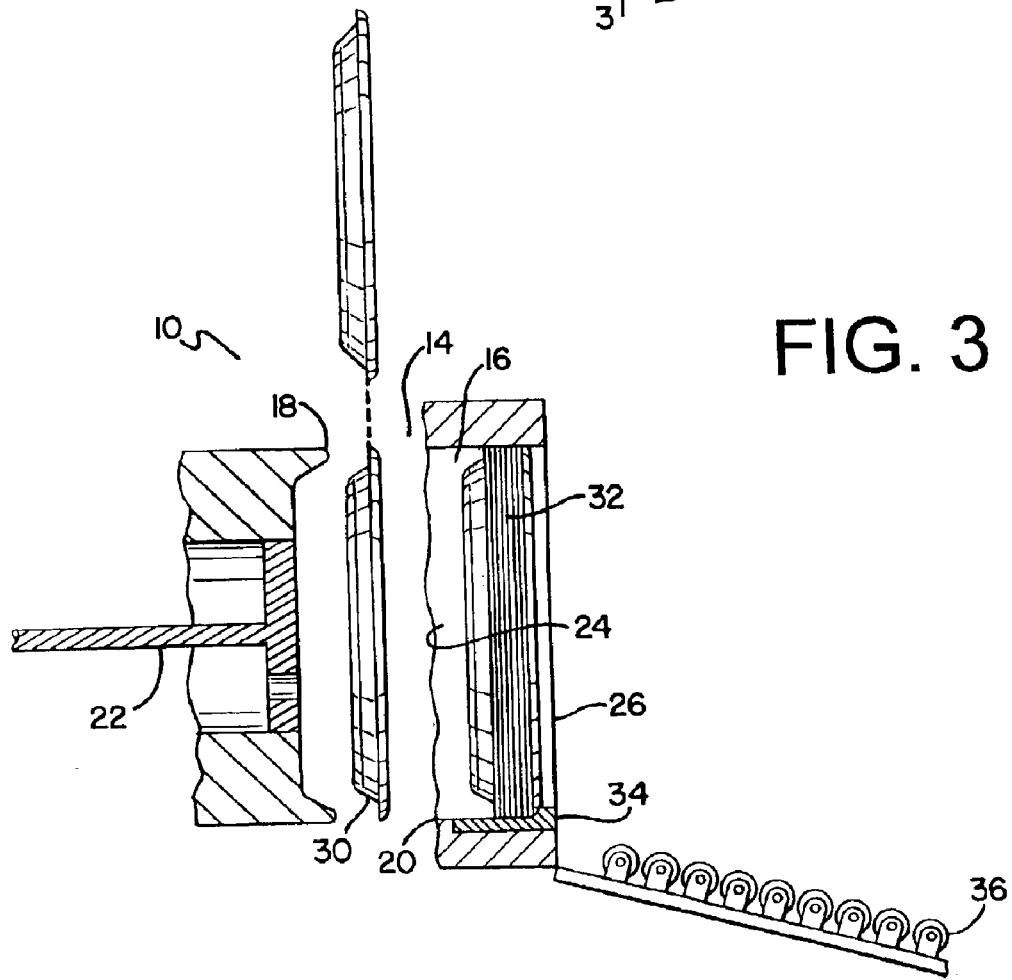
FIG. 3 is a cross-section of the single exit port taken along line 3—3 of FIG. 2.
Figure 4:
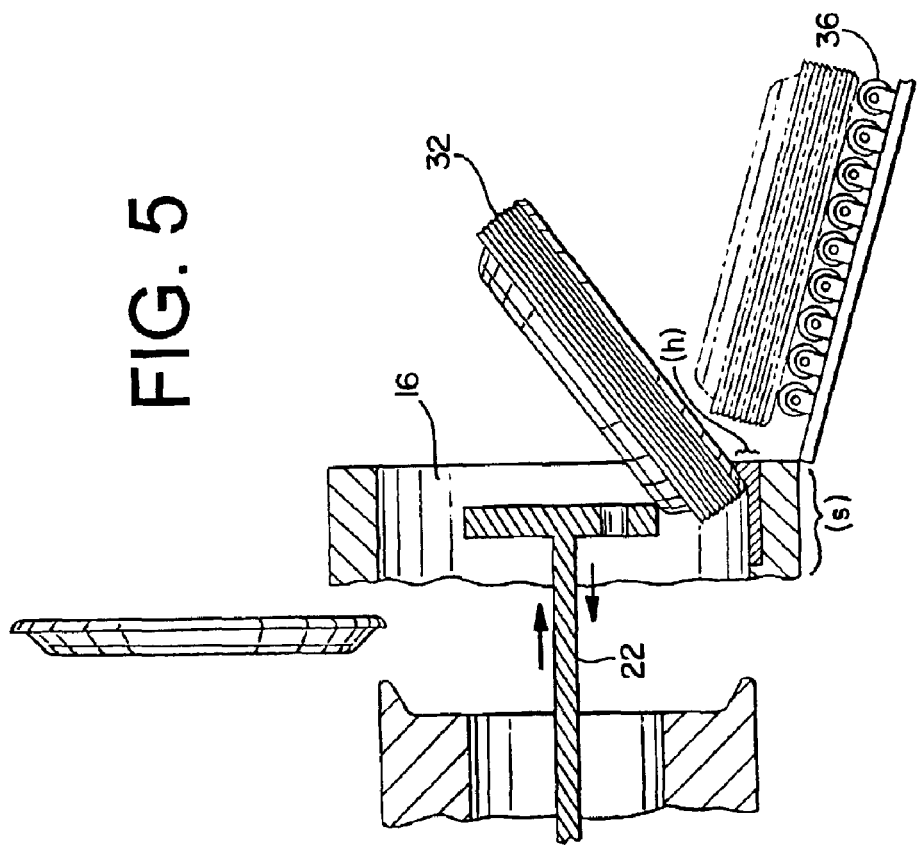
FIG. 4 is a cross-section similar to that of FIG. 3, illustrating the stroke of the ejector in accordance with one embodiment of the present invention.
Figure 5:
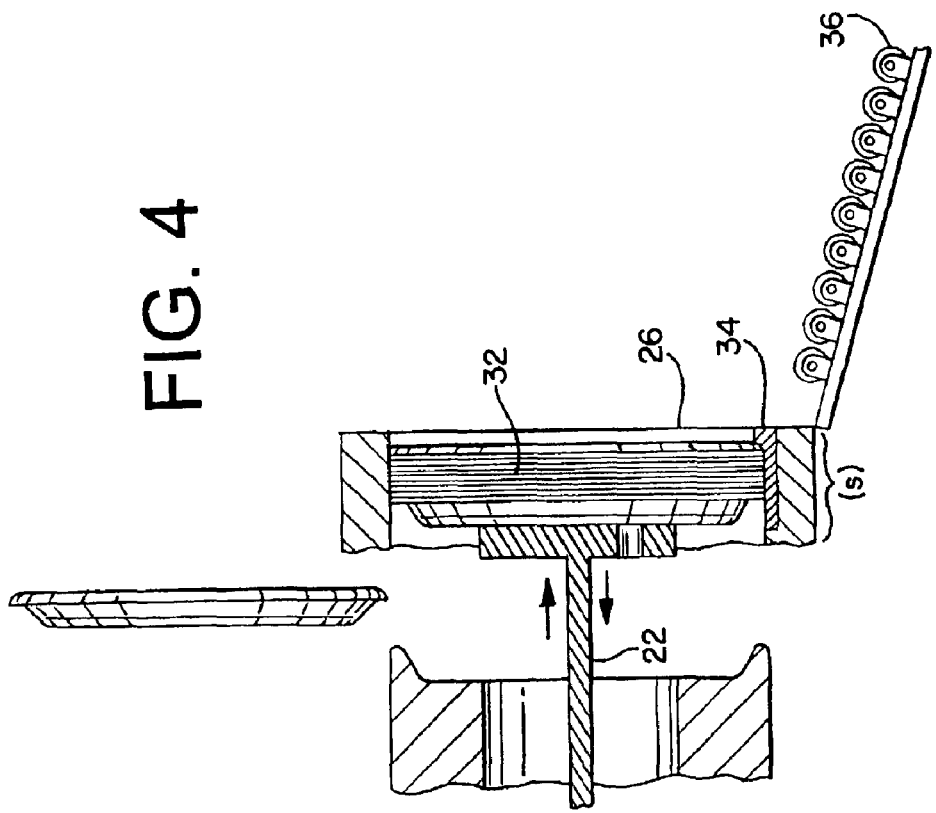
FIG. 5 is a cross-section similar to that of FIGS. 3 and 4, illustrating the long stroke of the ejector in accordance with one embodiment of the present invention.

In another embodiment, a surface 36 for receiving the predetermined number of stacked plates 30 can be positioned proximate the discharge end 26 of the cavity 16. The surface 36 could receive a stack of plates 30 in an orientation that is different from the orientation of the plates 30 in the cavity 16. Preferably, as shown in FIGS. 3–5, the surface 36 for receiving is a roller table which transports the stacks of plates 30 elsewhere for further processing. Other existing moveable surfaces for receiving could be adopted, and are contemplated by the present invention.

Referring to FIG. 9, a system 40 for packaging a predetermined number of nestable objects is also disclosed. The system 40 comprises a manufacturing source 50 for producing a plurality of nestable objects designed to be packaged, potential manufacturing sources having been previously described hereinabove. The system 40 further comprises a stacking apparatus 60 which stacks a predetermined number of nestable objects, the stacking apparatus being described hereinabove. The system 40 further comprises a packaging apparatus 70 configured for receiving and packaging the stacks of predetermined number of nestable objects.

The packaging apparatus 70 may be positioned to receive the nestable objects either directly from the stacking apparatus 60, or through an intermediary device (not shown). Such an intermediary device may take the form of a conveyor or similar mechanism. The intermediary may also be a worker who manually feeds the stacks into the packaging apparatus 70. Packaging apparates are well known in the prior art, and numerous different types of packaging apparatus may be selected for use in the packaging system 70.

Turning now to the operation of the stacking apparatus, a cavity 16 is provided as illustrated separately in each of FIGS. 1–8. A detailed description of the cavity 16 has been provided hereinabove.

The nestable objects or, as specifically shown in the figures, plates 30 may be received by the feed channel 14 as thermoformed objects in a web of material 28. The individual plates 30 are trimmed from the web 28 by the edges 18 and 20 (FIG. 3) of the punch and die and tamped into the cavity 16 at the receiving end 24 by ejector 22. The plate 30 is captured in one of the mechanisms illustrated in FIGS. 6–8 as previously described to maintain its orientation. Successive plates 30 are then stacked in an orientated position within the cavity 16. A plurality of such objects creates a stack 32 that has a thickness, the stack comprising a front end, which is the first plate to be received by the cavity 16, and a back end, which is the last plate to be received by the cavity 16. The thickness of the stack 32 increases incrementally as successive plates are received by the cavity 16 and stacked.

In a preferred embodiment, successive plates 30 are received at the same point in the cavity 16. The successive reception of these plates—each being advanced by the short stroke action of the ejector 22—causes plates already received within the cavity 16 to incrementally advance toward the discharge end 26 of the cavity 16. Additionally, as successive plates 30 are received, the stack 32 continues to increase in thickness, all being held within the mechanisms of FIGS. 6–8.

When the predetermined number of plates 30 is received, the thickness of the stack 32 may be just short of the length of the span (s). However, as the last plate is trimmed and tamped into the cavity 16 by ejector 22, a long stroke of the ejector 22 moves the stack 32 until the front end of the stack contacts the flange 34 and then just a little further. Additionally, referring to FIG. 8, the retractable mechanism 56 retracts fully during the final stroke of the ejector 22 to allow the passage of the stack 32. Then, with the push of the ejector 22, the stack 32 will "trip-over" the flange 34.

For example, if the predetermined number of plates is labeled "n," then the addition of the "$n^{th}$" plate by a long stroke of the ejector 22 would cause the stack of nestable objects being held in the bristled extensions 55 or the grooved tight spots 58 to come into functional contact with the flange 34. The extra length of the ejector stroke and the contact with flange 34 by the plate stack 32 causes the stack to fall forward, as shown in FIG. 5, until it comes to rest on roller table 36.

The predetermined number can be any number of objects that will allow for the automatic counting and stacking as disclosed herein. Preferably, the predetermined number, and thus the number of objects in the stack is within the range of 2 to 50. More preferably, the predetermined number is within the range of 8–35. Most preferably, the predetermined number is within the range of 20–25.

To accomplish the reorientation, as described, the flange 34 is designed and positioned to impinge upon a portion of the front end, causing the plates 30 to change orientation—i.e., from vertical to horizontal—as the stack 32 continues forward via the ejector 22. In one embodiment, the bottom portion of the front end of the stack 32 contacts the flange 34 at some point during the long stroke of the ejector 22. The flange 34 thereby prevents further movement of this bottom portion. However, with the addition of the "$n^{th}$" object the top portion continues to be edged forward, causing the entire stack 32 to fall forward. The stack 32 is thereby discharged from the discharged end 26 of the cavity 16 while the orientation is changing. The surface 36 may be provided for receiving the stack 32 of plates after it is discharged from the trimming device 10. The orientation of the stack 32 is thus changed from a substantially horizontal position to a substantially vertical position.

In another embodiment, the cavity 16 may be functionally affixed to the manufacturing source 50. The cavity 16 itself, in cooperation with the flange 34, might operate in a manner similar to that described hereinabove. In such an embodiment, a produced nestable object can be introduced into the receiving end 24 of the cavity 16 as it is produced, or soon thereafter. The manufacturing source 50 and the present invention defined hereinabove do not require a separate apparatus for counting and stacking a predetermined number of nestable objects; rather, they function to automatically stack a predetermined number of nestable objects.

While specific embodiments have been illustrated and described, numerous modifications are possible without departing from the spirit of the invention, and the scope of protection is only limited by the scope of the accompanying claims.

I claim:

1. A method for automatically stacking a predetermined number of nestable objects comprising the steps of:

providing a cavity suitable for containing a plurality of nestable objects, the cavity having a receiving end, a discharge end, and a flange, wherein the flange is functionally positioned proximate the discharge end;

receiving a series of consecutive nestable objects into the cavity at the receiving end to form an oriented, stacked arrangement of objects;

advancing the stacked arrangement toward the flange wherein the stacked arrangement, upon reaching a predetermined size, comes into functional contact with the flange;

discharging the stacked arrangement from the cavity onto a surface to thereby change the orientation of the stacked arrangement by preventing the advancing of an edge of the stacked arrangement by contact with the flange.

2. The method of claim 1 wherein consecutively received nestable objects advance previously received objects toward the flange.

3. The method of claim 1 wherein the receipt of the nestable object corresponding to the predetermined number in cooperation with a ejector mechanism advances the stacked arrangement of objects into functional contact with the flange.

4. The method of claim 1 wherein the predetermined number of nestable of objects is within the range of 2 to 50.

5. The method of claim 1 wherein the predetermined number of nestable objects is within the range of 8 to 35.

6. The method of claim 1 wherein the predetermined number of nestable objects is within the range of 20 to 25.

7. The method of claim 1 wherein the flange is stationary.

8. The method of claim 1 further comprising the step of transporting stacked arrangements after they are discharged from an area of discharge to allow for subsequent stacked arrangements to be discharged.

9. The method of claim 8 wherein the step of transporting is achieved by a conveyor.

* * * * *

UNITED STATES PATENT AND TRADEMARK OFFICE
CERTIFICATE OF CORRECTION

PATENT NO. : 6,918,737 B2
APPLICATION NO. : 10/292751
DATED : July 19, 2005
INVENTOR(S) : Randy Golden It is certified that error appears in the above-identified patent and that said Letters Patent is hereby corrected as shown below:

Column 1, Line 30, after the words "objects are to" insert --be--

Column 3, Line 37, the word "move" should be --moves--

Column 3, Line 38, the word "object" should be --objects--

Column 10, Line 29, the words "a ejector" should be --an ejector--

Column 10, Line 33, the word "of" between the words "nestable" and "objects" should be deleted so the phrase reads --nestable objects--

Signed and Sealed this

Twenty-ninth Day of May, 2007

JON W. DUDAS
*Director of the United States Patent and Trademark Office*